UNITED STATES PATENT OFFICE.

WILLIAM LUTWYCHE AND WILLIAM BARBER LUTWYCHE, OF LONDON, ENGLAND.

TRANSLUCENT ENAMEL.

SPECIFICATION forming part of Letters Patent No. 634,117, dated October 3, 1899.

Application filed December 29, 1897. Renewed September 6, 1899. Serial No. 729,668. (Specimens.)

*To all whom it may concern:*

Be it known that we, WILLIAM LUTWYCHE and WILLIAM BARBER LUTWYCHE, subjects of the Queen of England, residing at 19 Goulton road, Lower Clapton, London, N. E., England, have invented a new and useful Composition of Matter to be Used in the Manufacture of Translucent Enamel, (for which we have obtained a patent in Great Britain, No. 5,934, dated March 21, 1895,) of which the following is a specification.

For white enamel we employ the following: minium, one hundred and fifty to two hundred parts; boracic acid, eighty to one hundred parts; zinc oxid, fifty to eighty parts; stannic acid, thirty to forty parts; powdered flint, fifty to sixty parts; feldspar, five to ten parts; fluor-spar, five to ten parts; pearlash, two to five parts; the peculiar preparation of carbonate of soda known as "sel de St. Gobain," twenty to thirty parts; bone-ash, five to ten parts; calcined borax, eight to twelve parts; niter, two to five parts; chlorid of sodium, five to nine parts. These must be mixed and melted and then pounded in a mortar, after which the whole mass is ground to a fine powder.

For coloring the enamel we use for blue the compound hydrate of alumina and hydrated protoxid of cobalt; for black, the preparation of oxid of manganese known as "oxid noir de Dubois;" for yellow, oxid of antimony or oxid of uranium; for pink, carmine.

The proportions of the coloring-matters vary according to the tint required.

The whole is mixed, melted, and powdered, as above described.

The enamel is applied to glass or other material in the form of a paste, which is made by mixing the fine enamel-powder with water and applying the same to the surface of the glass or other material by means of a spatula. It is then placed in a kiln and fired till the enamel is melted and thoroughly united with the glass.

What we claim, and desire to secure by Letters Patent of the United States, is—

The herein-described composition of matter to be used in the manufacture of translucent enamel, consisting of minium, boracic acid, zinc oxid, stannic acid, powdered flint, feldspar, fluor-spar, pearlash, sel de St. Gobain, bone-ash, calcined borax, niter, chlorid of sodium, the compound hydrate of alumina and hydrated protoxid of cobalt, oxid noir de Dubois, oxid of antimony, oxid of uranium, and carmine, in the proportions and for the purposes specified.

In witness whereof we hereunto set our hands in presence of two witnesses.

WILLIAM LUTWYCHE.
WILLIAM BARBER LUTWYCHE.

Witnesses:
DANIEL BRIDEGROOM,
WILLIAM HENRY MUNNS.